United States Patent [19]

Unertl, Jr.

[11] 4,247,161
[45] Jan. 27, 1981

[54] RIFLE TELESCOPE

[76] Inventor: John Unertl, Jr., 4679 McKnight Rd., Pittsburgh, Pa. 15237

[21] Appl. No.: 37,354

[22] Filed: May 9, 1979

[51] Int. Cl.³ .............................................. G02B 27/32
[52] U.S. Cl. ........................................ 350/10; 33/246
[58] Field of Search .......................... 350/10; 356/247; 33/246, 247, 248

[56] References Cited

U.S. PATENT DOCUMENTS

| 3,184,852 | 5/1965 | Hageman | 350/10 X |
| 3,297,389 | 1/1967 | Gibson | 350/10 |
| 3,510,192 | 5/1970 | Akin, Jr. et al. | 350/10 |

*Primary Examiner*—John K. Corbin
*Assistant Examiner*—Matthew W. Koren
*Attorney, Agent, or Firm*—Buell, Blenko, Ziesenheim & Beck

[57] ABSTRACT

A rifle telescope is provided which may be of either the movable erector lens assembly type or the movable reticle assembly type and which provides resilient means in said tube biasing said assembly vertically and horizontally in said tube, an elevation adjustment means in said tube acting on said assembly in opposition to the vertical bias and a windage adjustment means in said tube acting on said assembly in opposition to the horizontal bias, at least one of said elevation adjustment means and windage adjustment means having a coarse and a vernier overrun adjustment means.

11 Claims, 7 Drawing Figures

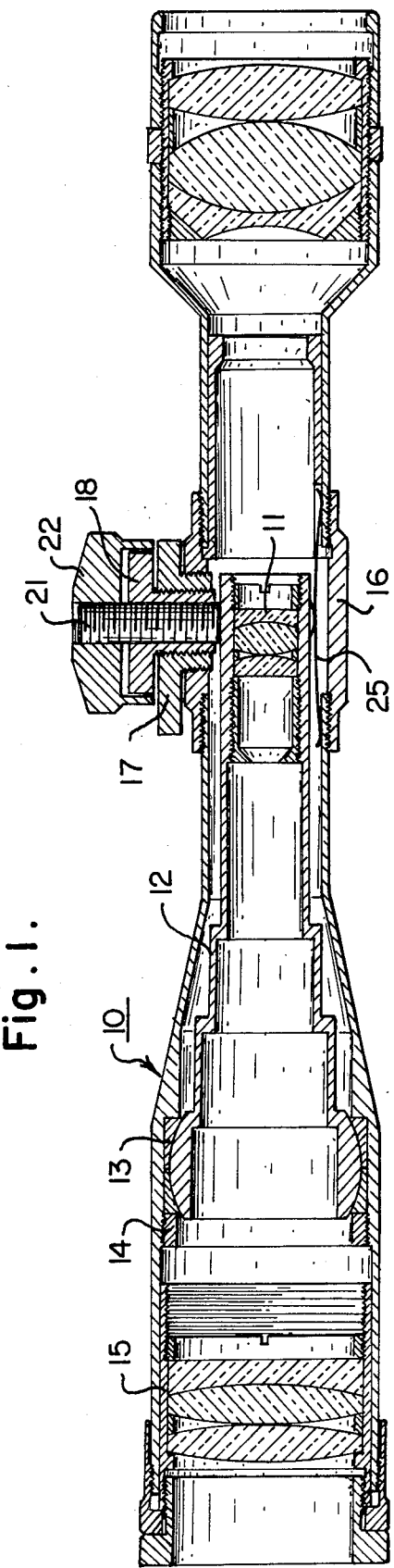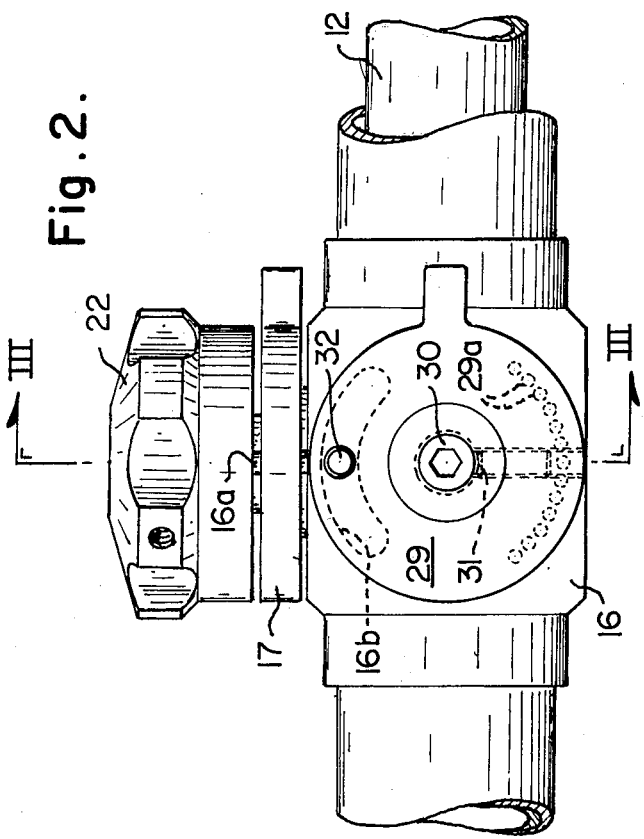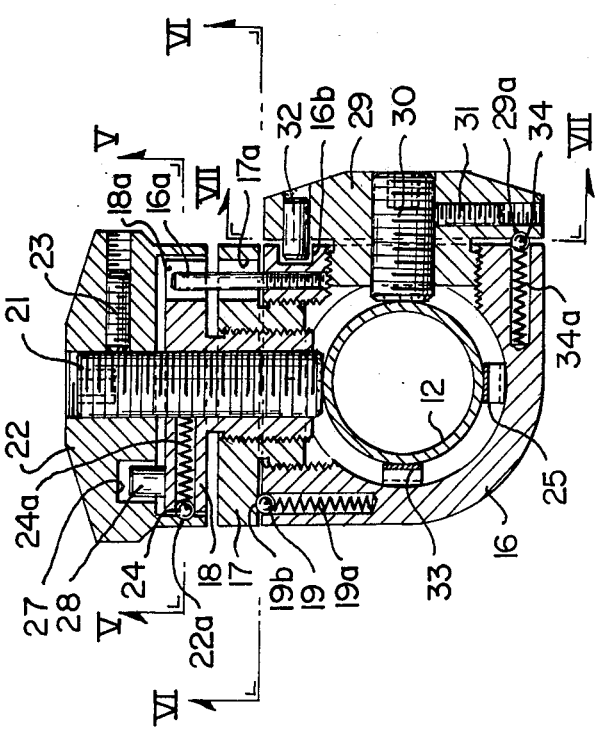

RIFLE TELESCOPE

The invention herewith disclosed relates to rifle telescopes and particularly to new and novel method of the adjustment of the aiming mark in rifle telescopes or similar instruments.

Most telescopes as used on rifles are of the general terrestrial type which consist of an optical system composed of an objective, erector and ocular. In such a system, two real focal planes exist at which point an aiming reticle can be located and which is then superimposed upon the telescope field when viewed by the observer. The reticle must be capable of orientation relative to the field of view so as to align the point of impact of the rifle. Most conventional instruments of this type have provision for elevation and azimuth adjustment.

Two distinct methods of accomplishing this relative positioning are possible. One method locates the reticle at the focal plane of the objective or ocular and the reticle is physically moved relative to the normal axis of the telescope. This method, however, has the characteristic that the reticle pattern excursions about in the field of view. The second method is to move the erector lens system transversely relative to the normal axis of the telescope. By this technique, the erector lens relays the objective focal plane and since it is being physically displaced laterally, the relayed image is also laterally displaced. The reticle pattern is located in the ocular field and the field has now been displaced relative to the reticle. From the observer's point of view, this is a more comfortable viewing situation rather than having the reticle located at various portions of the field.

The amount of travel required for reticle adjustment system is a function of the intrinsic alignment of the telescope upon the rifle and the characteristic trajectory drop of the projective at the ranges the weapon will be used. Normally, such a total range a telescope should have would be in the range of about 60 minutes. However, for high accuracy firing, it is necessary that the precision of adjustment be in the ¼ to ½ minute of angle range. It becomes immediately evident that if the high accuracy is to be attained, a considerable amount of physical adjustment will be required to cover the total travel range.

It is the purpose of this invention to provide an apparatus whereby total range of the normal instrument is covered in about one turn of a dial while imposing on this the availability of a high precision vernier adjustment. The design can be used for elevation only, both elevation and windage or any other combination as desired without limiting the scope of the invention. Also, while the system disclosed is shown for the erector translating type, it is equally applied for the reticle moving style.

In the foregoing general statement I have set out certain objects, purposes and advantages of the invention. Other objects, purposes and advantages of the invention will be apparent from a consideration of the following description and the accompanying drawings in which:

FIG. 1 is a longitudinal section through a telescope according to the invention;

FIG. 2 is an enlarged side elevational of the adjusting mechanism;

FIG. 3 is a section on the line III—III of FIG. 2;

Figure 4:
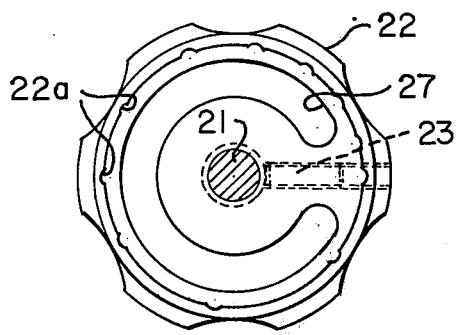
FIG. 4 is a bottom plan view of the control knob.
Figure 5:
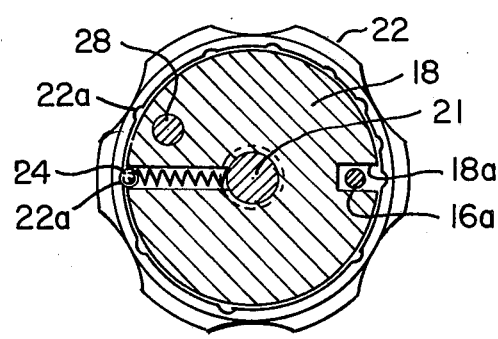
FIG. 5 is a section on the line V—V of FIG. 3.
Figure 6:
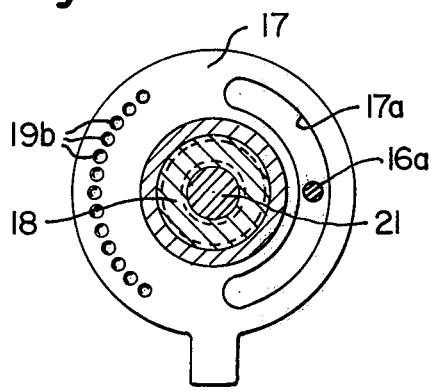
FIG. 6 is a section on the line VI—VI of FIG. 3.
Figure 7:
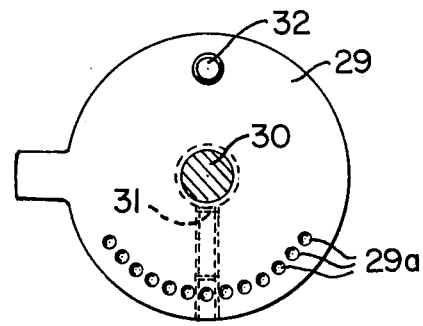
FIG. 7 is a section on the line VII—VII of FIG. 3.

Referring to the drawings I have illustrated a rifle telescope 10 according to my invention in which erector lenses 11 are mounted in a mechanical cell assemby 12 which has a spherical ended portion confined by a mating cup assembly 13 retained together by a threaded ring 14 in an objective lens cell housing 15. Element 12 is free to swivel transversely but limited axially. Similarly, the end of the erector cell could be mounted by an elastomer or spring which must have axial constraint but be flexible or movable transversely.

Housing 16 is located in the area of the erector lens system and is the base structure for the adjustment mechanism. Elements 16, 17 and 18 form a differential screw assembly which is used as the vernier high precision adjustment. Part 17 is threaded to fit into housing 16. It is provided with a semi-annular slot 17a to limit its total travel to less than a revolution by pin 16a. Ball 19 and spring assembly 19a engages into detents 19b on the underside of part 17 to give a click increment, preferably audible, of desired value when it is rotated. Part 18 is threaded to fit inside part 17 and has a semi-annular slot 18a which engages pin 16a which is mounted in housing 16. When part 17 is rotated by the suitable selection of the screw pitches, a differential screw motion results in the axial motion of part 18. Part 18 is internally threaded to engage zero and range travel screw part 21. Dial assembly 22 is internally threaded to fit said screw 21 and has setscrew 23 which is used to locate part 21 relative to part 22. Part 22 has axial grooves 22a which are positioned radially to correspond to desired bullet trajectory increments as selected and said grooves are engaged by ball 24 and spring 24a detent arrangement. Range calibration knob 22 is travel limited about its rotational axis by an internal semi-annular slot 27 and stop pin 28 on part 18. When the telescope is initially aligned, a suitable range is selected and the vernier dial is set up with a center zero. Range screw 21 is adjusted to "sight in" at a desired range, example 100 yards. It is then locked in position relative to knob 22. If range knob 22 is, for example, calibrated initially 100 to 1000 yards, each range can be set to its detent 22a index mark position. However, vernier knob 17 will allow a fine overrun adjustment to any range selection. Biasing of the erector cell assembly against adjustment screw 21 is made by a leaf or coil spring arrangement part 25.

On most military weapons, it is necessary that the windage adjustment project a minimal amount beyond the telescope body so as not to impair rapid loading and/or ejection of the fired case. The mechanism herewith described enables gross adjustment with a fine narrow range adjustment. Body 16 is threaded to receive adjustment knob 29 which is axially threaded for coarse windage adjustment on screw 30. The underface of knob 29 has detents 29a engaged by a ball 34 and spring 34a assembly. Body 16 has a radial groove 16b engaged by stop screw or pin 32 to limit total fine adjustment range. Biasing of the erector cell assembly 12 against screw 30 is made by leaf or coil spring 33. When the rifle point of impact is adjusted, fine adjustment is set in middle of its travel range with stop 32 in the middle of groove 16b. Set screw 31 is released and screw 30 is adjusted as required and then set screw 31 is tightened to lock screw 30 to adjustment dial 29. Windage can then be adjusted by the click of ball 34 in detent 29a without the need to look at the adjusting knob. If it is desired to have both coarse and fine vernier adjustment for windage as is described above for elevation, an intermediate screw corresponding to screw assembly 17 and 18 can be used between screw 29 and housing 16.

In the foregoing specification I have set out certain preferred practices and embodiments of my invention; however, it will be understood that this invention may be otherwise embodied within the scope of the following claims.

I claim:

1. In a rifle telescope having one of a movable erector lens assembly and a movable reticle assembly carried in a telescope tube, the improvement comprising resilient means in said tube biasing said assembly vertically and horizontally in said tube, an elevation adjustment means in said tube acting on said assembly in opposition to the vertical bias and a windage adjustment means in said tube acting on said assembly in opposition to the horizontal bias, at least one of said elevation adjustment means and windage adjustment means having a coarse and a vernier overrun adjustment means.

2. A rifle telescope as claimed in claim 1 wherein at least one of said elevation and windage adjustment means comprises a direct screw coarse adjustment and an intermediate differential screw fine adjustment.

3. A rifle telescope as claimed in claims 1 or 2 wherein said at least one of the elevation and windage adjustment means includes a non-linear range calibration dial on said coarse adjustment means and corresponding to any ammunition-rifle combination and a linear vernier adjustment acting thereon for fine adjustment.

4. A rifle telescope as claimed in claims 1 or 2 wherein the coarse adjustment means is a first screw threaded member having an end engaging said movable assembly for rapid movement of said assembly against the biasing means and said vernier adjustment means is an intermediate screw threaded member threadingly carrying said first screw threaded member for small incremental movement of said first screw against the assembly and biasing means.

5. A rifle telescope as claimed in claim 4 wherein said intermediate screw is threaded in said telescope tube.

6. A rifle telescope as claimed in claim 4 wherein both the first and intermediate screw are limited in movement relative to the telescope tube by cooperating stop means on said tube and screws.

7. A rifle scope as claimed in claim 6 wherein the cooperating stop means include a pin fixed in said tube, a semi-annular slot in said intermediate screw fitting over said pin and a slot in said first screw fitting over said pin.

8. A rifle scope as claimed in claim 6 wherein first detent means between said tube and intermediate member provide a physical indication of their relative positions and second detent means between said intermediate member and the first member provide a physical indication of their relative positions.

9. A rifle scope as claimed in claim 7 wherein first detent means between said tube and intermediate member provide a physical indication of their relative positions and second detent means between said intermediate member and the first member provide a physical indication of their relative positions.

10. A rifle scope as claimed in claim 8 wherein the first detent means includes semi-spherical openings spaced annularly around the intermediate member and spring-loaded ball means in said tube and the second detent means includes semi-cylindrical slots spaced annularly around the first member and radial spring-loaded ball means in the intermediate member engaging said slots.

11. A rifle scope as claimed in claim 9 wherein the first detent means includes semi-spherical openings spaced annularly around the intermediate member and spring-loaded ball means in said tube and the second detent means includes semi-cylindrical slots spaced annularly around the first member and radial spring-loaded ball means in the intermediate member engaging said slots.

* * * * *